United States Patent
Gooden et al.

(10) Patent No.: US 9,976,645 B2
(45) Date of Patent: May 22, 2018

(54) SYSTEM AND METHOD OF TRANSFERRING HEAT BETWEEN TRANSMISSION FLUID AND COOLANT IN OIL PAN

(71) Applicant: Ford Global Technologies, LLC, Dearborn, MI (US)

(72) Inventors: James Thomas Gooden, Canton, MI (US); Antonio Stranges, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 982 days.

(21) Appl. No.: 14/296,493

(22) Filed: Jun. 5, 2014

(65) Prior Publication Data
US 2015/0354692 A1    Dec. 10, 2015

(51) Int. Cl.
*F16H 57/04* (2010.01)

(52) U.S. Cl.
CPC ..... *F16H 57/0417* (2013.01); *F16H 57/0452* (2013.01); *F16H 57/0475* (2013.01)

(58) Field of Classification Search
CPC ............. F16H 57/0417; F16H 57/0452; F16H 57/0475
See application file for complete search history.

(56) References Cited

U.S. PATENT DOCUMENTS

| | | | |
|---|---|---|---|
| 2,577,188 A | 12/1951 | Hall | |
| 3,232,283 A | 2/1966 | Toland | |
| 3,792,727 A | 2/1974 | Stephenson | |
| 4,296,716 A | 10/1981 | Hofbauer et al. | |
| 4,545,334 A * | 10/1985 | Nakagawa | F01P 11/08 123/196 AB |
| 4,898,261 A | 2/1990 | Winberg et al. | |
| 5,408,965 A | 4/1995 | Fulton et al. | |
| 5,934,241 A * | 8/1999 | Von Esebeck | B01D 35/30 123/196 R |
| 6,058,898 A | 5/2000 | Freese | |
| 6,217,758 B1 | 4/2001 | Lee | |
| 6,220,521 B1 * | 4/2001 | Bartley | B62D 5/07 122/26 |
| 7,055,405 B1 | 6/2006 | Nitsche | |
| 7,637,337 B2 | 12/2009 | Stranges | |

(Continued)

FOREIGN PATENT DOCUMENTS

| | | |
|---|---|---|
| DE | 10 2008 008 585 | 8/2009 |
| EP | 1 264 970 | 5/2002 |

(Continued)

*Primary Examiner* — James A English
(74) *Attorney, Agent, or Firm* — Diederiks & Whitelaw, PLC (57) ABSTRACT

A system for transferring heat between a transmission fluid and a coolant in a transmission, such as in a motor vehicle, includes a transmission pump for circulating the transmission fluid and an oil pan having a heat exchanger. The heat exchanger has at least one transmission fluid layer and at least one coolant layer. The heat exchanger is located on a high-pressure side of the transmission pump and is configured to receive a pressurized flow of the transmission fluid from the transmission pump. Preferably, the heat exchanger receives the pressurized flow directly from either the transmission pump or a hydraulic control system.

20 Claims, 7 Drawing Sheets

(56) References Cited

U.S. PATENT DOCUMENTS

| | | | |
|---|---|---|---|
| 9,856,778 B2* | 1/2018 | Tokozakura | F01P 11/08 |
| 2003/0029412 A1* | 2/2003 | Kato | F01M 5/02 |
| | | | 123/195 C |
| 2004/0177827 A1* | 9/2004 | Hoyte | F01M 11/0004 |
| | | | 123/196 AB |
| 2005/0257766 A1* | 11/2005 | Rau | F01M 11/0004 |
| | | | 123/195 C |
| 2008/0257625 A1* | 10/2008 | Stranges | F01M 11/0004 |
| | | | 180/69.1 |
| 2009/0288617 A1* | 11/2009 | Hiyama | B60H 1/14 |
| | | | 123/41.14 |
| 2010/0212867 A1 | 8/2010 | Hollweck | |
| 2011/0120396 A1 | 5/2011 | Myers et al. | |
| 2011/0203668 A1* | 8/2011 | Hofig | F01M 1/02 |
| | | | 137/1 |
| 2015/0300220 A1* | 10/2015 | Mordukhovich | F01M 11/0004 |
| | | | 184/106 |

FOREIGN PATENT DOCUMENTS

| | | |
|---|---|---|
| FR | 2 878 893 | 1/2006 |
| JP | 354113737 | 9/1979 |

\* cited by examiner

SYSTEM AND METHOD OF TRANSFERRING HEAT BETWEEN TRANSMISSION FLUID AND COOLANT IN OIL PAN

BACKGROUND OF THE INVENTION

The present invention pertains to cooling transmission fluid in a motor vehicle and, more particularly, to a transmission oil pan with an integrated transmission fluid-to-coolant heat exchanger.

In a typical transmission for a motor vehicle, transmission fluid circulates continually throughout the transmission to lubricate and cool components that rotate at relatively high speed within a transmission case. The fluid is also used to actuate various clutches and brakes in order to change gear ratios. The fluid, which is drawn by a transmission pump from an oil pan located below and secured to the transmission case, returns to the oil pan by gravity feed after circulating through the transmission. Its temperature increases in this flow path and is lowered by passing the fluid through a heat exchanger, which is usually located behind a radiator that forms a portion of an engine cooling system in which heat from an engine coolant is transferred to an air stream flowing through the radiator. Alternatively, the temperature of the fluid can be lowered by passing the fluid through a fluid-to-coolant heat exchanger located outside the transmission. The systems that support this heat exchange consume packaging space, introduce leak risks and can be inefficient, costly and cumbersome to assemble and service.

To overcome these difficulties, one proposed solution has been to integrate a heat exchanger into a transmission oil pan, such as is shown in U.S. Pat. No. 7,637,337, which is hereby incorporated by reference in its entirety. However, this arrangement is not considered to provide sufficient heat transfer for all applications. Therefore, there is a need in the art for a transmission oil pan with an integrated fluid-to-coolant heat exchanger that provides an increased heat transfer capability.

SUMMARY OF THE INVENTION

The present invention is directed to a system for transferring heat between a transmission fluid and a coolant in a transmission of a motor vehicle. The system includes a transmission pump for circulating the transmission fluid, an oil pan having a heat exchanger with at least one transmission fluid layer and at least one coolant layer. The heat exchanger is located on a high-pressure side of the transmission pump and is configured to receive a pressurized flow of the transmission fluid from the transmission pump. Preferably, the heat exchanger receives the pressurized flow directly from either the transmission pump or a hydraulic control system.

In one embodiment, a transmission sump is defined by an upper surface of the heat exchanger and four sidewalls of the oil pan. In a preferred embodiment, the heat exchanger contacts all four of the sidewalls. In another embodiment, the transmission fluid flows in a first direction and the coolant flows in a second direction, opposite the first direction. In a preferred embodiment, one or both of the transmission fluid and coolant flows in a U-shaped path within its respective layer. In another preferred embodiment, one or both of the transmission fluid and coolant flows from a center of the heat exchanger to an edge of the heat exchanger within its respective layer. In still another preferred embodiment, the heat exchanger has at least two transmission fluid layers and at least two coolant layers. One or both of the transmission fluid and coolant flows in a first direction in a first layer and in a second direction, opposite the first direction, in the second layer.

Additional objects, features and advantages of the present invention will become more readily apparent from the following detail description of preferred embodiments when taken in conjunction with the drawings wherein like reference numerals refer to corresponding parts in the several views.

DETAILED DESCRIPTION OF THE PREFERRED EMBODIMENTS

Detailed embodiments of the present invention are disclosed herein. However, it is to be understood that the disclosed embodiments are merely exemplary of the invention that may be embodied in various and alternative forms. The figures are not necessarily to scale, and some features may be exaggerated or minimized to show details of particular components. Therefore, specific structural and functional details disclosed herein are not to be interpreted as limiting, but merely as a representative basis for teaching one skilled in the art to variously employ the present invention.

In the art, transmission fluid is often referred to simply as oil or, in the case of automatic transmission fluid, ATF. Throughout this specification, the terms "transmission fluid" and "fluid" are used. For the purposes of the present invention, the terms "transmission fluid", "fluid", "ATF" and "oil" should be considered interchangeable. Regardless of the particular term used, the intended reference is to the fluid that flows throughout a transmission in order to cool and lubricate portions thereof. In contrast, the term "coolant" is used to refer to the fluid that flows within an engine cooling system, and which can also cool or heat the transmission fluid when placed in a heat-exchanging configuration.

Figure 1:
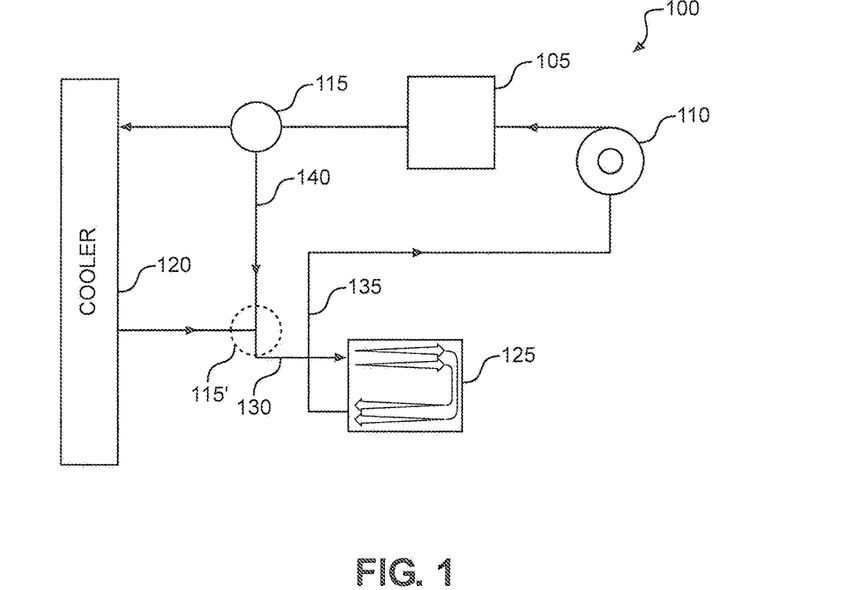
FIG. 1 is a schematic view of a powertrain cooling system and a transmission oil pan in accordance with the present invention.

With initial reference to FIG. 1, there is shown a powertrain cooling system 100 in accordance with the present invention. Powertrain cooling system 100 includes an engine 105, a hydraulic pump 110, a thermostat 115, a cooler 120 (e.g., a radiator) and a transmission oil pan 125. A coolant is sent to engine 105 by pump 110 and then supplied, through thermostat 115, to cooler 120 where heat is exchanged from the coolant to an air stream flowing through cooler 120. Low temperature coolant exiting cooler 120 flows through an inlet line 130 to oil pan 125, and its integrated heat exchanger (not separately labeled), where heat is exchanged between a transmission fluid and the coolant. After exiting oil pan 125, the coolant returns to pump 110 through an outlet line 135 and is recirculated through powertrain cooling system 100. In certain situations, such as when the ambient air temperature is low, the coolant is sent to oil pan 125 through a bypass line 140 without passing through cooler 120 so that the transmission fluid is heated rather than cooled. In an alternative arrangement, thermostat 115 is replaced by a thermostat 115', which is located at an outlet of cooler 120 and which performs the same function. Although one particular arrangement of powertrain cooling system 100 is described, the present invention is usable in connection with any of a variety of different powertrain cooling arrangements.

Figure 2:
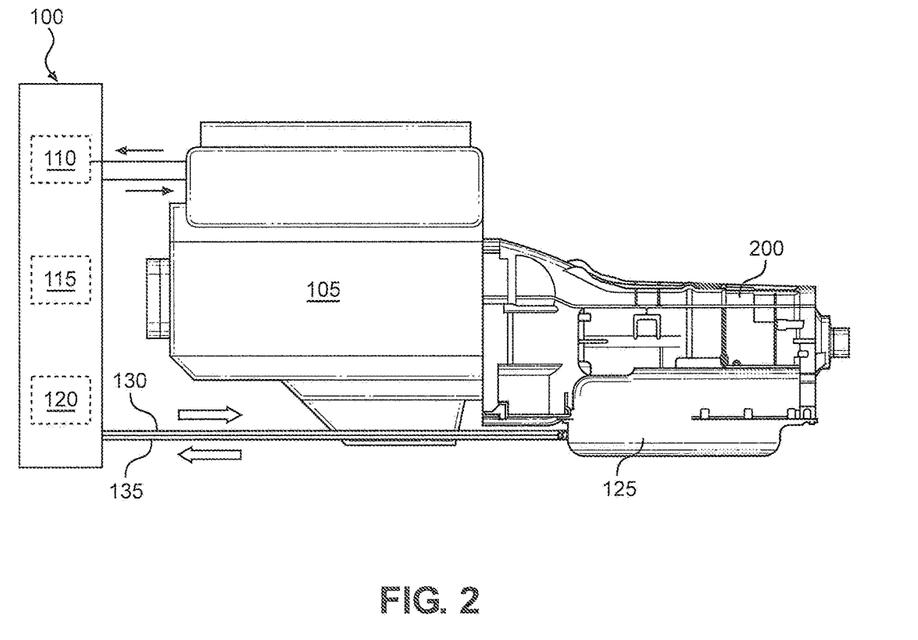
FIG. 2 is an additional view of the powertrain cooling system and transmission oil pan.

FIG. 2 shows powertrain cooling system 100 along with a transmission case 200. Oil pan 125 is securely coupled to transmission case 200 with inlet line 130 and outlet line 135 running between oil pan 125 and the rest of powertrain cooling system 100. With brief reference back to FIG. 1, it can be seen that inlet line 130 carries coolant from cooler 120 (or thermostat 115 when cooler 120 is bypassed) to oil pan 125, while outlet line 135 carries coolant from oil pan 125 back to pump 110.

FIG. 3 again shows transmission case 200 and oil pan 125 coupled thereto, but with a portion of oil pan 125 cut away so that its interior is visible. Inside oil pan 125, there is a hydraulic control system 300, a heat exchanger 305 and a filter 310. Hydraulic control system 300 controls the flow of the transmission fluid throughout the transmission. Heat exchanger 305 has two flow paths 320, 321, which enable the transmission fluid to flow between heat exchanger 305 and hydraulic control system 300, for example. Flow paths 320, 321 will be described in more detail in connection with FIG. 4. Additionally, a port 315 is visible on an exterior surface of oil pan 125. A second port is also provided, although it is not visible in this view. Port 315 and the second port each connect to one of inlet line 130 or outlet line 135 so that the coolant is able to enter and exit oil pan 125 (and heat exchanger 305 located therein). The portion of oil pan 125 located above an upper surface 325 of heat exchanger 305 generally defines a transmission sump 330, which temporarily holds the transmission fluid being circulated through the transmission.

Figure 4:
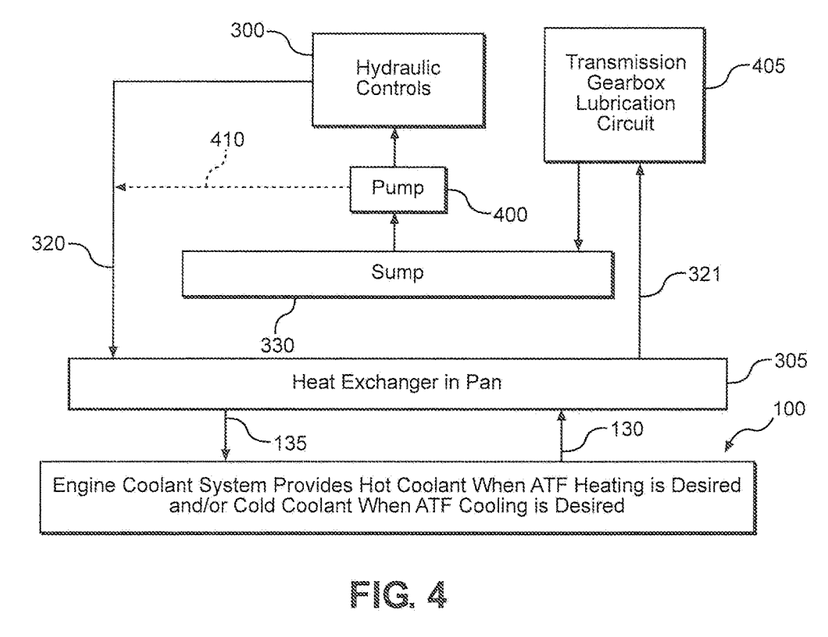
FIG. 4 is a schematic view of a flow of a transmission fluid through a transmission in accordance with the present invention.

With reference now to FIG. 4, the flow of the transmission fluid through the transmission and oil pan 125 is schematically shown. Beginning from transmission sump 330, the transmission fluid is sent by a transmission pump 400 to hydraulic control system 300 and, from there, to heat exchanger 305 through flow path 320. In heat exchanger 305, the transmission fluid is either cooled or heated, as desired, by the coolant entering and exiting heat exchanger 305 through inlet line 130 and outlet line 135. The transmission fluid then travels to a transmission gearbox lubrication circuit 405 through flow path 321 in order to lubricate and either cool or heat the transmission. From transmission gearbox lubrication circuit 405, the transmission fluid returns to transmission sump 330 (usually through the action of gravity).

Although one possible embodiment is described above, it should be readily apparent that other arrangements can be employed. For example, in another embodiment, the transmission fluid can flow directly from transmission pump 400 to heat exchanger 305, as shown by a flow path 410. However, regardless of the particular arrangement chosen, it is preferred that heat exchanger 305 be located on a high-pressure side of transmission pump 400 (as opposed to a low pressure or suction side) such that heat exchanger 305 receives a pressurized flow of the transmission fluid in order to provide better heat transfer. In the context of a transmission generally, the high-pressure side of a transmission pump is the portion of the flow path that runs from the pump until just before a transmission sump. The low-pressure side begins at the sump and continues until the transmission fluid reaches the pump again. Therefore, it should be readily apparent that both embodiments shown in FIG. 4 locate heat exchanger 305 on the high-pressure side of transmission pump 400.

Figure 3:
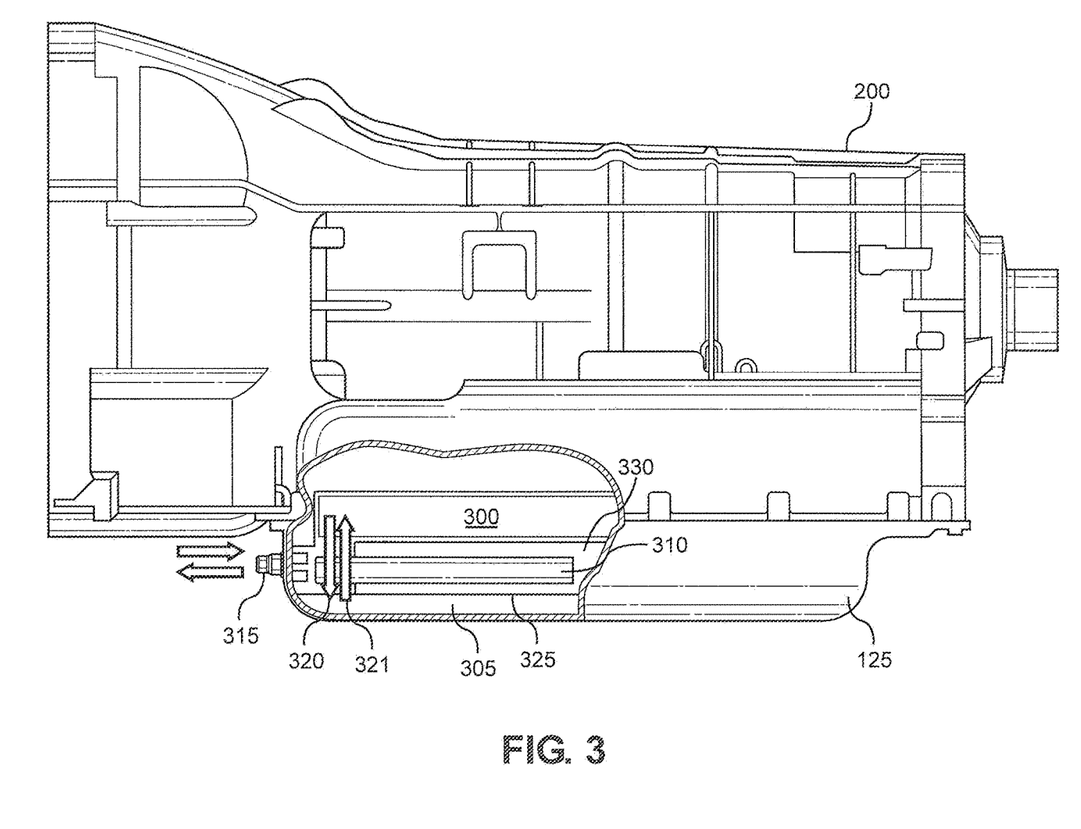
FIG. 3 is a cutaway view of the transmission oil pan coupled to a transmission case.
Figure 5:
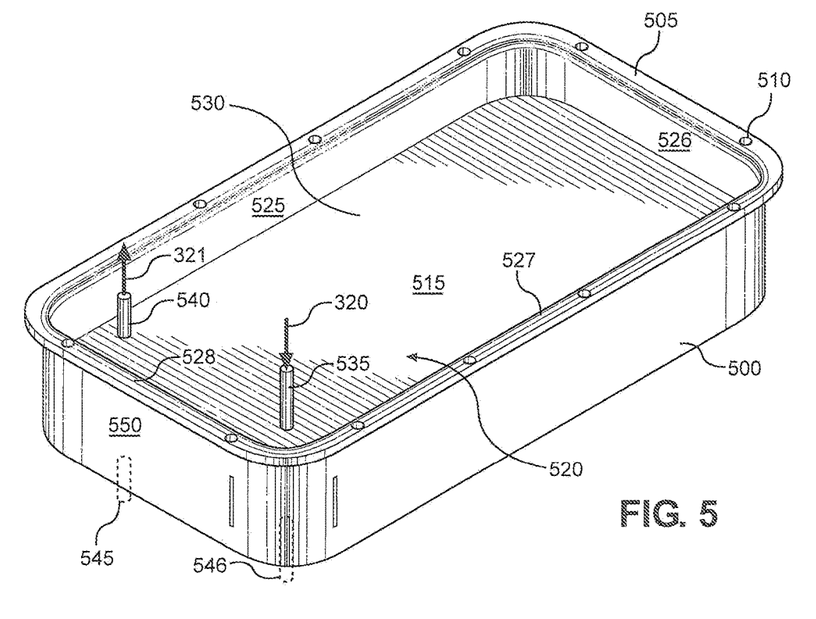
FIG. 5 is a perspective view of the transmission oil pan with integrated heat exchanger.

FIG. 5 shows an oil pan 500 detached from transmission case 200. As a result, a flange 505 having a plurality of mounting holes (one of which is labeled 510) is visible. Fasteners (not shown), such as bolts, are inserted into the mounting holes in order to securely couple oil pan 500 to transmission case 200. An upper surface 515 of a heat exchanger 520 is also visible in this view. Together with inner walls 525, 526, 527, 528, upper surface 515 defines a transmission sump 530, as described above. The transmission fluid entering heat exchanger 520 travels through a heat exchanger inlet 535 (along flow path 320), while the transmission fluid exiting heat exchanger 520 travels through a heat exchanger outlet 540 (along flow path 321). Port 315 and the second port of oil pan 125 (described in connection with FIG. 3) are replaced with a port 545 and a port 546 (shown in dashed lines), which are located on a bottom face of oil pan 500. In another embodiment, as shown in FIG. 3, ports 545, 546 can be located on an exterior face 550 of oil pan 500, for example. The specific location of ports 545, 546 is generally determined by packaging constraints and the configuration of heat exchanger 520. Regardless of their location, ports 545, 546 connect to inlet line 130 and outline line 135, respectively, so that the coolant can enter and exit oil pan 500.

Figures 6A, 6B:
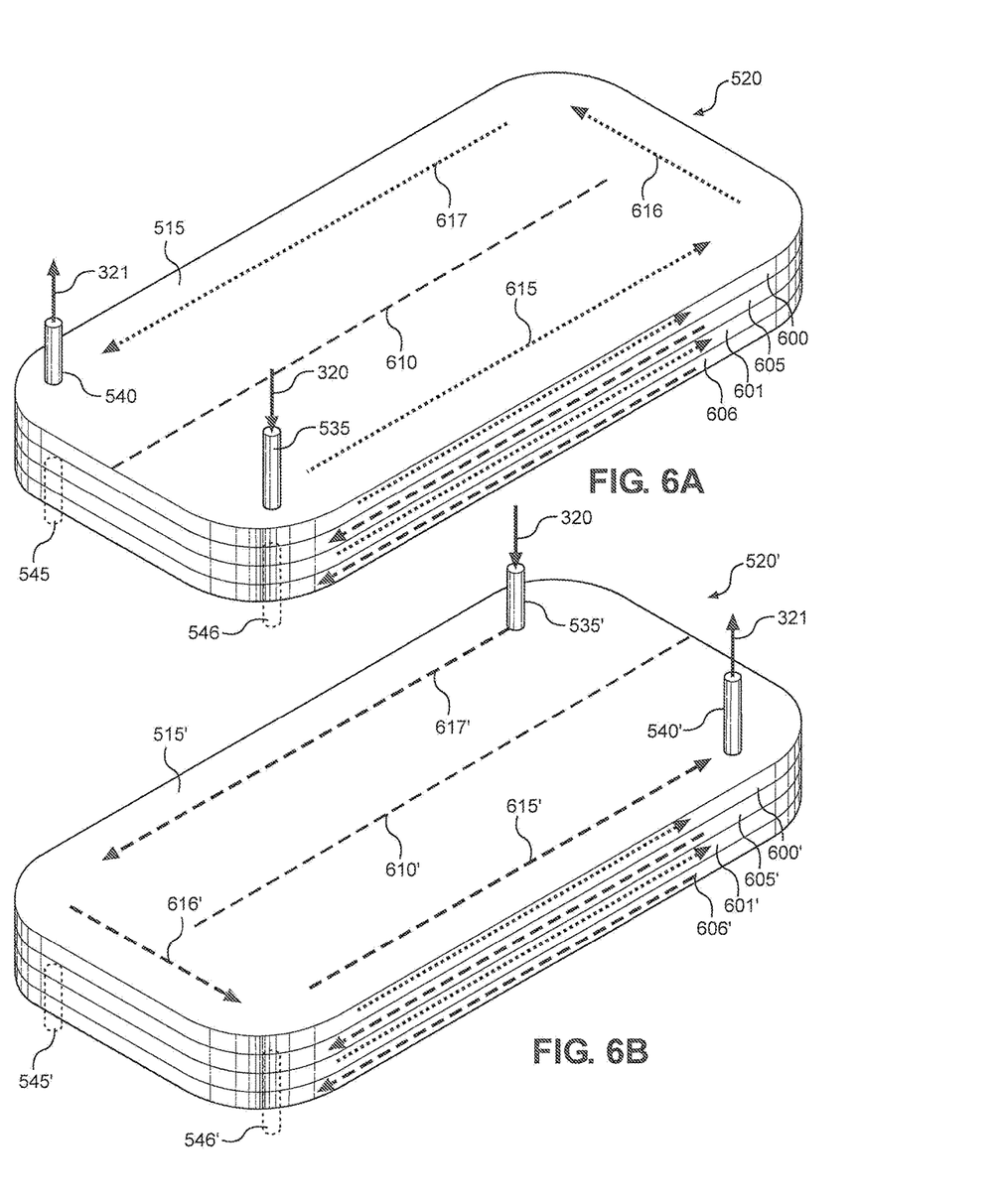
FIG. 6A is a perspective view of a first embodiment of the heat exchanger.
FIG. 6B is a modified version of the heat exchanger of FIG. 6A.

Turning to FIG. 6A, there is shown a first embodiment of heat exchanger 520, which is separated from oil pan 500 for clarity. Heat exchanger 520 includes a plurality of layers in a manner analogous to a stacked plate heat exchanger. Specifically, in this embodiment, there are four layers, with the transmission fluid flowing through layers 600, 601 (as illustrated by a first set of arrows) and the coolant flowing through layers 605, 606 (as illustrated by a second set of arrows). The style of the arrows for each liquid is consistent throughout the Figures. Alternating between the transmission fluid and coolant layers provides better heat transfer between the fluids. Additionally, the transmission fluid and coolant preferably flow in opposite directions to further increase heat transfer. In this embodiment, the fluids are traveling along generally U-shaped paths. In particular, layer 600 includes a divider 610 such that the transmission fluid flows from heat exchanger inlet 535 to heat exchanger outlet 540 along the path illustrated by arrows 615, 616, 617. Alternatively, divider 610 can be formed integrally with a turbulator (not shown) located within layer 600. The transmission fluid flows through layer 601 in the same manner.

With respect to the coolant, it enters heat exchanger 520 through port 545 and flows through layers 605, 606 along a path that runs in a direction opposite that shown by arrows 615, 616, 617 (partially illustrated by the second set of arrows). The coolant then exits through port 546. Because the coolant flows in the opposite direction of the transmission fluid, its inlet (i.e., port 545) is located below heat exchanger outlet 540, while its outlet (i.e., port 546) is located below heat exchanger inlet 535. However, the location of ports 545, 546 does not need to correspond to the location of inlet 535 and outlet 540. As shown in FIG. 6B, a port 545' and a port 546' can be located at the opposite end of heat exchanger 520' from a heat exchanger inlet 535' and a heat exchanger outlet 540' while still enabling the coolant and transmission fluid to flow in opposite directions. Additionally, although a total of four alternating layers 600, 601, 605, 606 are shown, other arrangements are possible. For example, more or fewer plates could be used for either or both fluids. Also, the number of layers for each fluid does not need to be equal, and the fluids need not alternate. Furthermore, as discussed above, one or more turbulators or dividers can be provided in each of layers 600, 601, 605 and 606.

Figure 7:
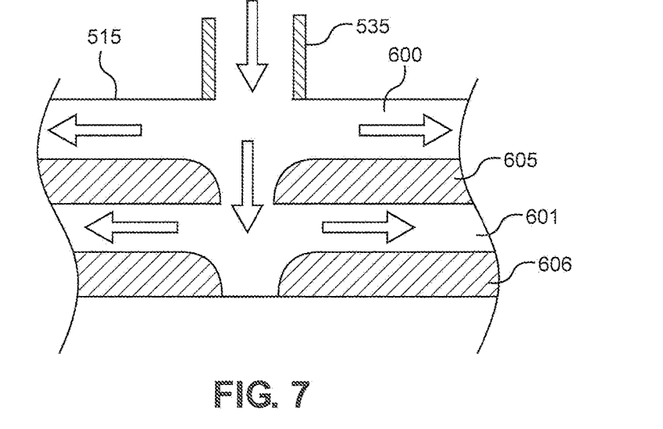
FIG. 7 is a simplified view showing a flow of transmission fluid and coolant through a heat exchanger.

FIG. 7 shows a simplified view of the flow of transmission fluid and coolant through heat exchanger 520. Specifically, FIG. 7 is a partial cross-section showing heat exchanger inlet 535 and layers 600, 601, 605 and 606. The transmission fluid enters heat exchanger inlet 535 and travels through layers 600, 601 along the paths indicated by the arrows. Port 545 is not shown, but it functions in a similar manner, with the coolant being directed to flow through layers 605, 606. For clarity, no turbulators are shown in FIG. 7.

Figure 8:
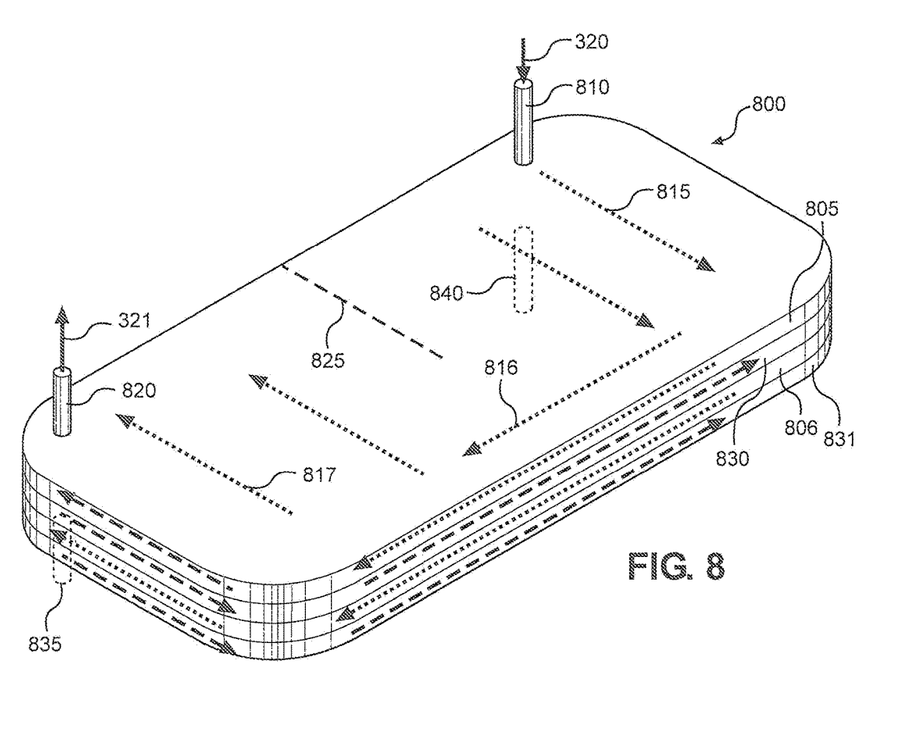
FIG. 8 is a perspective view of a second embodiment of the heat exchanger.
Figure 9A:
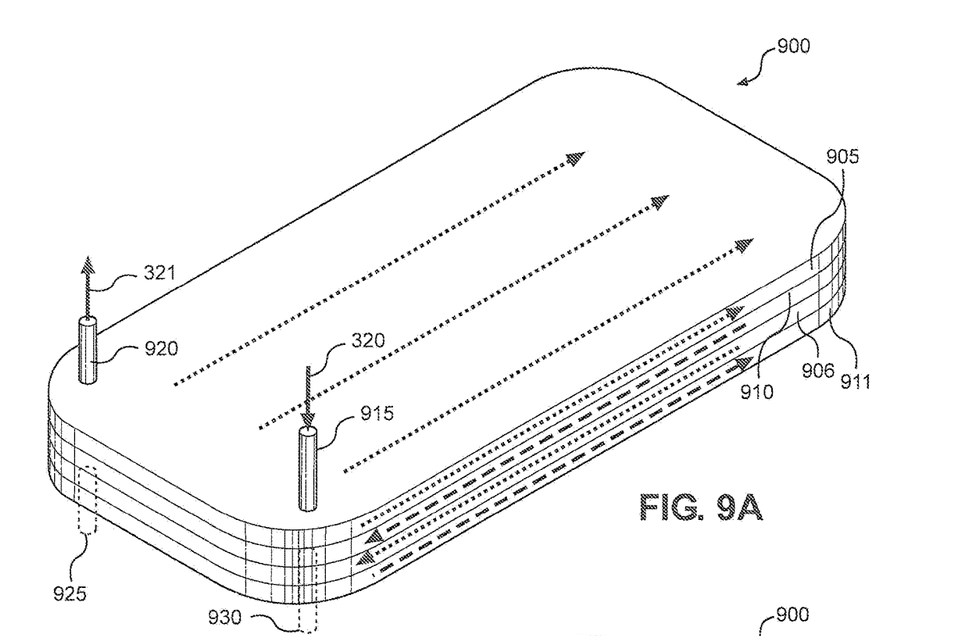
FIG. 9A is a perspective view of a third embodiment of the heat exchanger.
Figure 9B:
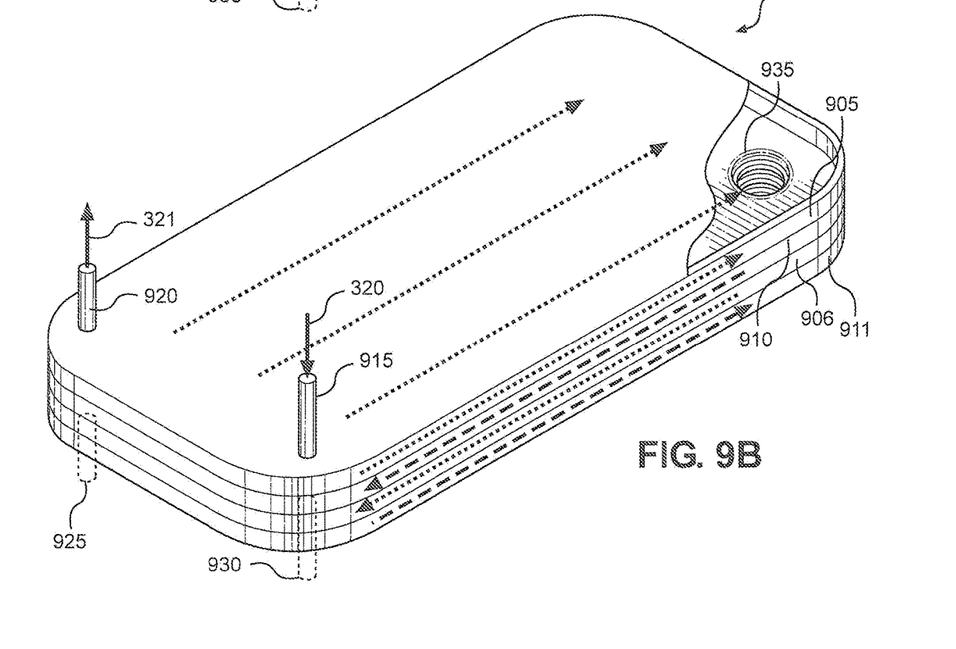
FIG. 9B is a perspective view of the heat exchanger of FIG. 9A with a portion cut away.
Figure 10:
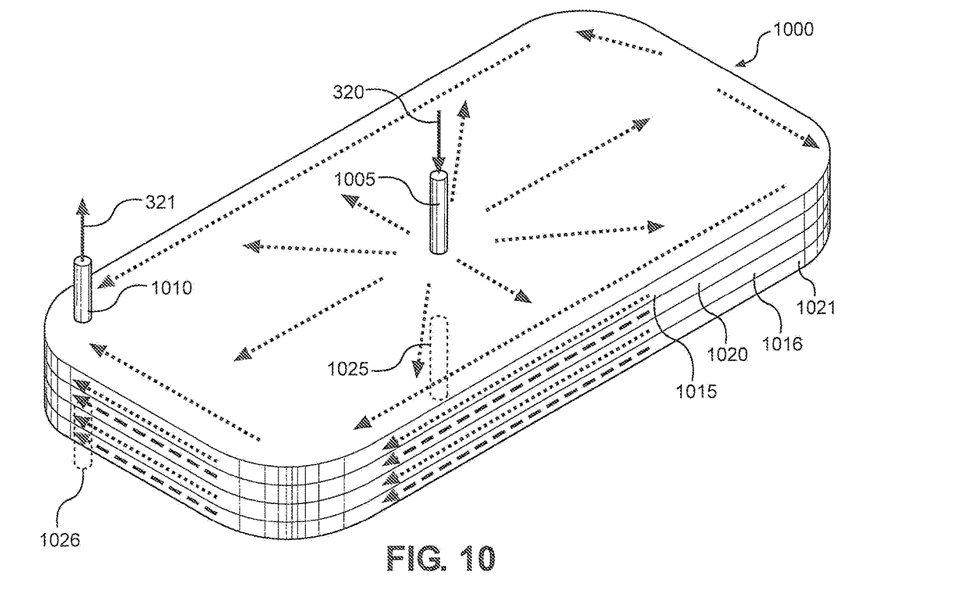
FIG. 10 is a perspective view of a fourth embodiment of the heat exchanger.

FIGS. 8, 9 and 10 show additional embodiments of heat exchanger 520. Specifically, FIG. 8 shows a heat exchanger 800 where the transmission fluid and coolant follow a U-shaped path that is arranged laterally rather than longitudinally with respect to heat exchanger 800. For example, in plate 805, the transmission fluid flows in through a heat exchanger inlet 810, along the path shown by arrows 815, 816, 817 and out through heat exchanger outlet 820. A divider (one of which is labeled 825) is provided in each of plates 805, 806, 830 and 831 in order to create the U-shaped path. Similar to heat exchanger 520, the transmission fluid flows through layers 805, 806 while the coolant flows through layers 830, 831. The coolant enters heat exchanger 800 through port 835 and exits through port 840. However, as with heat exchanger 520', ports 830, 840 can be located on the opposite side of heat exchanger 800 from inlet 810 and outlet 820.

In a heat exchanger 900 of FIGS. 9A-B, the transmission fluid and coolant each flow in a first direction in respective first layers 905, 911 and a second direction, opposite the first direction, in respective second layers 906, 910. In other words, the transmission fluid enters heat exchanger 900 through a heat exchanger inlet 915, travels the length of layer 905 in a first direction, travels the length of layer 906 in a second direction and then exits heat exchanger 900 through heat exchanger outlet 920. Similarly, the coolant enters port 925, travels the length of layer 911 in the first direction, travels the length of layer 910 in the second direction and then exits through port 930. As discussed above in connection with the other embodiments, ports 925, 930 need not be located at the same end of heat exchanger 900 as inlet 915 and outlet 920. FIG. 9B shows heat exchanger 900 with a portion cut away so that the interior of layer 905 is visible. A hole 935 allows the transmission fluid to flow from layer 905 to layer 906. While a single hole is shown, multiple holes can be provided as appropriate.

Furthermore, although no holes are visible in FIGS. 6A-B, 8 or 10, holes are provided in the layers of each of heat exchangers 520, 800, 900 and 1000 to allow the transmission fluid and coolant to pass between the layers. This is shown and described in connection with FIG. 7, discussed above.

With respect to FIG. 10, there is shown a heat exchanger 1000 with a heat exchanger inlet 1005 located in the center of heat exchanger 1000 and a heat exchanger outlet 1010 located near an edge of heat exchanger 1000. In such an arrangement, it is desirable to ensure that there is an even flow of the transmission fluid across the entirety of each layer 1015, 1016 so that the transmission fluid does not merely flow directly from heat exchanger inlet 1005 to heat exchanger outlet 1010. This can be accomplished through suitable dividers (not shown), for example. Also, the outer perimeter of layers 1015, 1016, 1020 and 1021 can be open to flow (i.e., turbulators do not extend to the edges) to simplify flow tuning. The coolant moves through layers 1020, 1021 in an analogous manner, with the coolant entering through a 1025 in the center of heat exchanger 1000 and exiting through a port 1026 near an edge of heat exchanger 1000. Alternatively, one or both of the transmission fluid and coolant can flow in the opposite direction, from an inlet near an edge of heat exchanger 1000 to an outlet in the center of heat exchanger 1000. Additionally, in any of these variations, the outlet (or inlet if the inlet is located near an edge of heat exchanger 1000) for one fluid can be located near a first edge while the outlet (or inlet) for the other fluid is located near a second edge, which is opposite the first edge, in order to increase the degree to which the fluids flow in opposite directions.

Based on the above, it should be readily apparent that the present invention provides a transmission oil pan with an integrated fluid-to-coolant heat exchanger having an increased heat transfer capability. This increased heat transfer capability is the result of at least two distinct features: the location of the heat exchanger on the high pressure side of the transmission pump and the stacked plate arrangement of the heat exchanger. Although described with reference to preferred embodiments, it should be readily understood that various changes or modifications could be made to the invention without departing from the spirit thereof. For example, the number and arrangement of the heat exchanger layers can be varied. Similarly, the transmission fluid and coolant layers need not have the same type of flow path within a given heat exchanger. Additionally, the flow of the transmission fluid through the transmission can be modified. In general, the invention is only intended to be limited by the scope of the following claims.

The invention claimed is:
1. A motor vehicle comprising:
an engine;
a transmission; and
a system for transferring heat between a transmission fluid and a coolant including:
a transmission pump configured to circulate the transmission fluid; and
an oil pan including a heat exchanger, the heat exchanger having at least one transmission fluid layer and at least one coolant layer, whereby heat is transferred between the transmission fluid and the coolant, wherein the heat exchanger is located on a high-pressure side of the transmission pump and is configured to receive a pressurized flow of the transmission fluid from the transmission pump.

2. The motor vehicle of claim 1, further comprising a hydraulic control system, wherein the heat exchanger is configured to receive the pressurized flow of the transmission fluid directly from the transmission pump or the hydraulic control system.

3. The motor vehicle of claim 1, wherein:
the oil pan includes four sidewalls;
the heat exchanger has an upper surface; and
a transmission sump is defined by the four sidewalls and the upper surface.

4. The motor vehicle of claim 1, wherein the heat exchanger is configured so that transmission fluid flows in a first direction in the at least one transmission fluid layer and the coolant flows in a second direction, opposite the first direction, in the at least one coolant layer.

5. The motor vehicle of claim 1, further comprising a divider such that the transmission fluid flows in a U-shaped path in the at least one transmission fluid layer or the coolant flows in a U-shaped path in the at least one coolant layer.

6. The motor vehicle of claim 1, wherein the heat exchanger has at least two transmission fluid layers.

7. The motor vehicle of claim 6, wherein a layer of the at least one coolant layer is located between the at least two transmission fluid layers.

8. A system for transferring heat between a transmission fluid and a coolant comprising:
a transmission pump configured to circulate the transmission fluid; and
an oil pan including a heat exchanger, the heat exchanger having at least one transmission fluid layer and at least one coolant layer, whereby heat is transferred between the transmission fluid and the coolant, wherein the heat exchanger is located on a high-pressure side of the transmission pump and is configured to receive a pressurized flow of the transmission fluid from the transmission pump.

9. The system of claim 8, wherein the heat exchanger is configured to receive the pressurized flow of the transmission fluid directly from the transmission pump or a hydraulic control system.

10. The system of claim 8, wherein:
the oil pan includes four sidewalls;
the heat exchanger has an upper surface; and
a transmission sump is defined by the four sidewalls and the upper surface.

11. The system of claim 8, wherein the heat exchanger is configured so that the transmission fluid flows in a first direction in the at least one transmission fluid layer and the coolant flows in a second direction, opposite the first direction, in the at least one coolant layer.

12. The system of claim 8, further comprising a divider such that the transmission fluid flows in a U-shaped path in the at least one transmission fluid layer or the coolant flows in a U-shaped path in the at least one coolant layer.

13. The system of claim 8, wherein the heat exchanger has at least two transmission fluid layers.

14. The system of claim 13, wherein a layer of the at least one coolant layer is located between the at least two transmission fluid layers.

15. A method of transferring heat between a transmission fluid and a coolant in an oil pan including a heat exchanger located on a high-pressure side of a transmission pump and having at least one transmission fluid layer and at least one coolant layer, the method comprising:
circulating the transmission fluid with the transmission pump; and
receiving, with the heat exchanger, a pressurized flow of the transmission fluid from the transmission pump.

16. The method of claim 15, wherein receiving the pressurized flow of the transmission fluid from the transmission pump includes receiving the pressurized flow directly from the transmission pump or a hydraulic control system.

17. The method of claim 15, further comprising:
causing the transmission fluid to flow in a first direction in the at least one transmission fluid layer; and
causing the coolant to flow in a second direction, opposite the first direction, in the at least one coolant layer.

18. The method of claim 15, further comprising:
causing the transmission fluid to flow in a U-shaped path in the at least one transmission fluid layer; or
causing the coolant to flow in a U-shaped path in the at least one coolant layer.

19. The method of claim 15, wherein the heat exchanger has at least two transmission fluid layers.

20. The method of claim 19, wherein a layer of the at least one coolant layer is located between the at least two transmission fluid layers.

* * * * *